UNITED STATES PATENT OFFICE

PAUL PFEIFFER, OF BONN-ON-THE-RHINE, GERMANY

ADDITIVE COMPOUND OF DIETHYL BARBITURIC ACID AND 4-DIMETHYLAMINO-2.3-DIMETHYL-1-PHENYL-5-PYRAZOLON

No Drawing. Application filed March 20, 1925, Serial No. 17,130, and in Austria March 27, 1924.

My invention refers to a new pharmaceutical product and to the method of making same and it more particularly relates to products obtained by combining diethyl-barbituric acid with 4-dimethylamino-2.3-dimethyl-1-phenyl-5-pyrazolon, the components being combined in molecular proportion (1:1).

I have found that it is not possible to produce a compound of this kind by allowing watery solutions of the two components to slowly evaporate in the free air. I have, however, ascertained that such compound can easily be obtained if the components are dissolved in a suitable solvent and are then concentrated by evaporation as far as possible, preferably until fine droplets separate out. I may, however, also dissolve the components in a small quantity of a warm solvent such as water and then allow the solution to cool down. In either case the compound aimed at is obtained from a warm concentrated solution on the cooling of the solution. I further prefer using a certain excess of 4-dimethylamino-2.3-dimethyl-1-phenyl-5-pyrazolon in order that the diethyl-barbituric acid which dissolves with comparative difficulty is kept in solution. If no excess of 4-dimethylamino-2.3-dimethyl-1-phenyl-5-pyrazolon is used and the solution of the two components is concentrated, there will take place at first a separation of the diethyl-barbituric acid and only after further concentration the mother liquor yields the additive compound.

I have further ascertained that it is possible to effect a saving in 4-dimethylamino-2.3-dimethyl-1-phenyl-5-pyrazolon by utilizing the mother liquors arising in the process as solvents for the raw materials or components. If this mother liquor is used for dissolving the components I prefer proceeding in such manner that I dissolve in the warm mother liquor as much of a mixture of diethyl-barbituric acid and of 4-dimethylamino-2.3-dimethyl-1-phenyl-5-pyrazolon in molecular proportion as has crystallized out before in the form of the additive compound. If thereupon the solution cools down, another quantity of this compound separates out, this quantity being almost equal to the quantity of the components dissolved in the mother liquor. This way of proceeding can be followed repeatedly and if the mother liquor used as a solvent should assume a yellow color it can be decolorized by shaking it with some animal charcoal at ordinary temperature.

Example 1

A watery solution of 1 part by weight of 4-dimethylamino-2.3-dimethyl-1-phenyl-5-pyrazolon and 0.3 parts by weight of diethyl barbituric acid is concentrated on the water bath until the first oil droplets begin separating out. The limpid liquid which has a slight yellow color is now allowed to cool down in the free air. Soon there begins a considerable crystallization of colorless crystals having a silky luster and the form of needles up to 3/8 of an inch long. These crystals are placed on the suction filter and then dried in the air.

The compound has the formula:

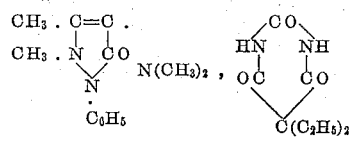

Example 2

20 parts by weight of 4-dimethylamino-2.3-dimethyl-1-phenyl-5-pyrazolon and 6 parts by weight diethyl barbituric acid are dissolved under heating to about 60 to 65° C. in 200 ccm. water and the solution is then allowed to cool down. During the cooling down there gradually crystallize out about 9.3 parts by weight of the additive compound. To the mother liquor are now added 5 parts by weight of 4-dimethylamino-2.3-dimethyl-1-phenyl-5-pyrazolon and 4 parts by weight of diethyl barbituric acid, the liquor being heated to about 60 to 65° C. The oil which has formed is separated by filtration and the solution is allowed to cool down. There again separates out a quantity of the additive compound equalling about 7.7 parts by weight. The process can be carried on in a similar manner by utilizing the mother liquor resulting in one operation for dissolving the components in a subsequent operation.

The new additive compound thus obtained has a melting point of about 113 to 115°, however, the melt becomes entirely limpid only at about 140°, the melting being accompanied by a certain decomposition. The compound which is adapted for use as a soporific and as an analgetic gives a limpid solution with water. It is dissolved by benzene, diethyl barbituric acid separating off and 4-dimethylamino-2.3-dimethyl-1-phenyl-5-pyrazolon being dissolved. An analysis of the compound resulted in the following figures:—

| Calculated for $C_8H_{12}O_3N_2$, $C_{13}H_{17}ON_3$ | Found by analysis |
|---|---|
| $C = 60.72\%$ | $60.80\%$ |
| $H = 7.03\%$ | $7.17\%$ |
| $N = 16.86\%$ | $17.02\%$ |

I wish it to be understood that I do not desire to be limited to the exact proportions and sequences of operations described, for obvious modifications will occur to a person skilled in the art.

I claim:—

As a new product, the additive compound obtained by combining diethyl barbituric acid with 4-dimethylamino-2.3-dimethyl-1-phenyl-5-pyrazolon substantially in molecular proportion such compound forming substantially colorless needles of silky luster melting about between 113–115° C., dissolving in water and being decomposed by benzene.

In testimony whereof I affix my signature.

PAUL PFEIFFER.